Sept. 19, 1939.   J. H. VAN UUM   2,173,524
SPRING CLIP DEVICE
Filed May 28, 1937

INVENTOR.
JOHN H. VAN UUM
BY
ATTORNEY.

Patented Sept. 19, 1939

2,173,524

UNITED STATES PATENT OFFICE 2,173,524

SPRING CLIP DEVICE

John H. Van Uum, Lakewood, Ohio

Application May 28, 1937, Serial No. 145,332

3 Claims. (Cl. 189—88)

This invention relates to spring clips for securing hollow members to apertured supports by interengagement of the spring clip with the member and with an aperture of the support.

In the mounting of hollow members such as automobile body bead trim on apertured supports, the customary practice has been to utilize snap fasteners which usually comprise a piece of spring metal in the form of integral divergent legs with head portions thereon which are movable relatively toward each other by flexure of the legs for entering the bead trim and which reflex toward their original position for engaging within and securing the bead trim to the support. Such clips are provided with locking shoulder portions which underlie the inner face of the support adjacent the aperture and other portions which overlie the inturned flanges of the bead trim, these shoulders and portions being sloped somewhat so that the clip may adjust itself in the aperture and trim member. It has been found, however, that a more positive lock than provided by prior clips is required due to the fact that the prior clips permit removal of the clips from the outside of the body and the trim is removed surreptitiously quite frequently.

One of the principal objects of the present invention therefore is to provide a snap fastening device or clip for fastening bead trim to an apertured support and which is so arranged that when the clip is attached to the support, removal is difficult, if not almost impossible, from the outside of the support or vehicle body. At least, the removal must be accomplished in a manner such as to bend or distort the bead trim and render it useless to the person removing it.

Another object of the present invention is to provide a clip which may be installed on the support prior to the installation of the bead trim and which will positively lock and hold itself in the position in which installed so that a number of the clips may be secured in place on the support and the trim subsequently snapped thereon readily in a manner providing for effective quantity assembly.

A more specific but equally important object is to provide a clip which positively interlocks itself with the support in such a manner that it is not detachable from the support except by engaging the end within the support and compressing it, and any attempt to disengage it from the support or bead trim from the outside causes it to interlock with the support more positively.

Other objects and advantages will become apparent from the following specification wherein reference is made to the drawing, in which.

Figure 1:
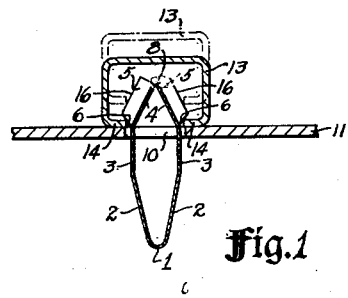
Fig. 1 is a longitudinal sectional view through a clip embodying the principles of the present invention and the apertured support and hollow trim member secured together by the clip, and is taken on a plane indicated by the line 1—1 in Fig. 2.
Figure 3:
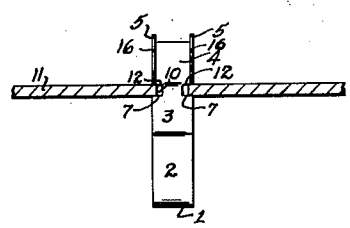
Fig. 3 is a side elevation of the clip.
Figure 2:
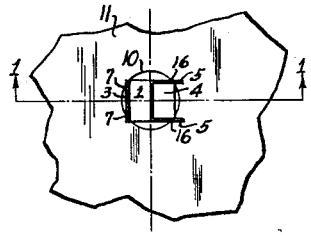
Fig. 2 is a plan view of the clip and support of Fig. 1 with the trim member removed.
Figure 4:
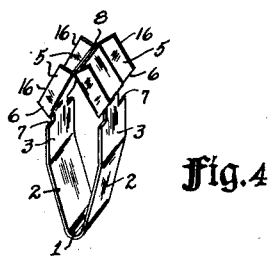
Fig. 4 is a perspective view thereof.

Referring to Figs. 1 to 4, inclusive, the clip illustrated comprises a strip of spring metal bent intermediate its ends so as to provide one portion in the form of a nose 1 with integral spaced legs 2 which may be divergent upwardly therefrom. The upper portions 3 of the legs 2 may be substantially parallel to each other, if desired. The leg portions 3 terminate upwardly in head portions 4, the head portions 4 being convergent upwardly or away from the nose 1, as better illustrated in Fig. 1. Each of the head portions 4 is provided with out-turned locking flanges 5, the lower edges of which slope inwardly toward the leg portions 3 to provide locking shoulders 6.

Adjacent the juncture of the head portions 4 and leg portions 3, the clip is provided with notches 7 which are open at the lateral limits of the legs and extend inwardly and are preferably of substantially the same width as the thickness of the supporting member with which the clip is to be associated. The head portions 4 converge, as described, and abut at their upper ends, as indicated at 8, when the clip is in normal unstressed condition or at least when installed, so that a substantially closed spring loop locking effect or spring effect is provided. The nose portion 1 and legs 2 provide a shank portion of the clip which is insertable nose foremost through an associated aperture 10 in the support 11. The aperture 10 is so related to the shank of the clip that the clip must be compressed by flexure of the legs relatively toward each other upon entering the aperture. The clip interlocks with the aperture of the support by partial reflexure of the legs within the aperture while the clip remains in partially stressed condition.

The clip may be readily installed in the support and guided during installation by the elongated shank portion. When it is forced through the aperture 18 a sufficient distance to dispose the head portion in the proper position relative to the outer face of the support, the legs and head portions tend to reflex apart laterally of the aperture and dispose the upper and lower edges defining the notches 7 in engagement with the outer and inner faces, respectively, of the support 11 so that the portion of the support adjacent the aperture is positively locked between the edges of the notches.

It is apparent that if an attempt is made to remove the clip from the support by exerting against one leg of the clip a pressure normal to the flat surface thereof, the notches of the other leg will be forced more firmly into locking position and any attempt to loosen the clip by exerting pressure parallel to the flat dimension of the legs will cause the opposite notches of each leg to engage the support more tightly. Thus, the clip may be installed in the aperture of the support by movement nose foremost thereinto for the required distance with accompanying flexure and will reflex outwardly so as to engage the notches in positive interlocking relation with the support adjacent the aperture. These notches, thus snugly engaging the support, prevent pushing of the clip additionally through the aperture during the installation of the bead trim. The upper edges of the notches, indicated at 12, may operate effectively as land shoulders.

Next, the bead trim member, such as indicated at 13, is installed, the bead trim member having inturned flanges such as illustrated at 14 for engagement beneath the lower edges 6 of the flanges 5 of the head portions 4 of the clip. The bead trim 13 is first positioned on the clip, as indicated in dot and dash lines, Fig. 1, and then pressed firmly toward the support, whereupon the flanges 14 of the trim member engage the sloping edges 16 of the flanges 5 and flex the head portions and legs relatively together until the flanges pass beneath the shoulders 6. Thereupon the entire reflexure of the legs and head portions is effective for springing the edges 6 of the flanges 5 into firm engagement with the inner walls of the flanges 14 of the bead trim. Due to the slope of the lower edges 6 of the flanges 5, compensation is provided for slight differences in thickness of the gauge of the bead trim or burrs or irregularities along the edges of the flanges 14 of the clip or of the trim resulting from manufacture.

In Figs. 5 to 8 there is illustrated a modification of the clip wherein the locking pressure of the head portions is segregated from the locking pressure of the leg portions. In the modified clip illustrated, the clip is formed of a single piece of spring metal having a nose portion 20 with integral legs 21 extending therefrom, the legs 21 being substantially parallel for a material portion of their length. The upper ends of the legs then diverge, as indicated at 22, for a predetermined distance and then again extend parallel to each other, as indicated at 23. The leg portions terminate at their upper ends in convergent portions 24 which abut, as indicated at 25, preferably before installation but at least afterward. This abutting relation renders the support engaging portion of the clip a substantially closed loop and thus provides more effective spring pressure, and in fact, utilizes the spring effect of the entire legs instead of only the portions thereof adjacent the nose.

Beyond the point of abutment of the leg portions are head portions 27 which extend outwardly and downwardly and terminate at their free ends in inturned flanges 28 which provide locking shoulders for engaging the interior of the bead trim flanges. In the legs, preferably between the portions 22 and the point of abutment 25, are notches 29 which in form and function correspond to the notches as heretofore described, and which, when the clip is installed in the aperture 30 of a support 31, positively interlock with the support so as to prevent removal of the clip in both directions axially of the aperture. The notches 29 are so positioned relative to the head portions 27 that the free end portions of the flanges 28 thereof are spaced from the outer face of the support a distance very slightly less than the thickness of the flanges of the bead trim to be associated therewith. Thus the upper edges of the notches 29 engage the support and act as land shoulders to prevent movement of the clip on through the aperture of the support as the bead trim is installed by pressing it thereonto.

Figures 5, 6:
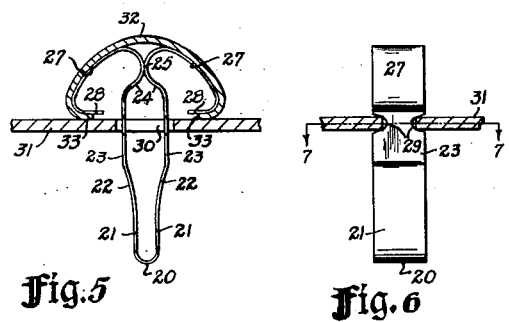
Fig. 5 is an end elevation of a modified form of the clip in connection with a supporting structure and bead trim, the support and trim being shown in section for clearness in illustration.
Fig. 6 is a side elevation of the clip illustrated in Fig. 5.
Figures 7, 8:
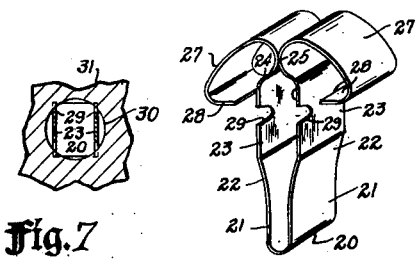
Fig. 7 is a sectional view taken on a plane indicated by the line 7—7 in Fig. 5.
Fig. 8 is a perspective view of the clip illustrated in Fig. 5.

The bead trim 32 is positioned on the clip, as indicated by the dot and dash line in Fig. 5, and is then pressed downwardly so that the head portions 27 are flexed relatively together and reflex outwardly after the inturned flanges 33 of the bead trim have passed just beyond the flanges 28 of the head portions. This outward flexure, accompanied by slight flexure of the flange portion 28 causes the flange portion 28 to seat firmly against the inner wall of the flanges 33, thus firmly anchoring the clip in position.

Due to the fact that the leg portions 21 are substantially parallel for an appreciable part of their length, an elongated guide is provided for initially guiding the clip in proper alignment in the aperture preparatory to final installation thereof.

In the form of the invention illustrated in Figs. 1 to 4, the notches 7 are shown as substantially complementary to the support with which they are to be engaged. The notches 29, however, in Fig. 6, are of gradually decreasing width toward the lateral midportion of the legs and are slightly wider at their outer ends than the thickness of the support with which they are to be associated. Due to the shape of the notches, therefore, the clip may accommodate itself to supports of slightly different gauges or to those in which slight burrs are formed about the apertures during manufacture. Either type of notch may be used in either form of the clip.

Having thus described my invention, I claim:

1. In a combination including a support having a rigid portion defining an aperture, a member to be secured to the support and having an opening, and a spring clip device for securing the member to the support, said device comprising a single piece of relatively flat spring metal having portions in flatwise spaced relation to each other and in the form of legs, portions in the form of heads and having locking portions arranged to flex toward each other to enter the opening in the member to be secured to the support and to reflex toward their normal position after passage through said opening, whereby the member may be installed on the clip by pressing it thereonto, said clip being arranged to be inserted endwise, legs foremost, through the aperture of the support with accompanying flexure of the legs flatwise toward each other by the said rigid portion of the aperture, said legs having notches at their lateral margins, said aperture being decrescent in the directions of reflexure of the legs, each notch being arranged to engage with both the inner and outer surfaces of the support adjacent the aperture upon reflexure of the legs after the clip is inserted in the aperture sufficiently to align the notches with the edges of the aperture, said notches being positioned relative to the said locking portions to constrain the locking portions to predetermined spaced relation to the support.

2. A combination including a support having inner and outer faces and a rigid portion defining an aperture which is decrescent in width, a member to be secured to the support, and a spring clip device adapted for connection to the support and having a snap-fastening part onto which the member may be snapped by pressing the member thereonto toward the support when said device is installed in the aperture with the part in predetermined spaced relation from the outer face of the support, characterized in that the spring clip device comprises a pair of spaced legs receivable through said aperture, said legs being of less width than the portion of the aperture through which they are received and at least one of said legs being of greater width than a decreased width portion of the aperture, said legs being resiliently movable relatively toward and away from each other in a direction generally at right angles to the width of said one leg, and said one leg having a notch at one of its lateral margins, said notch being arranged to engage with both the inner and outer surfaces of the support upon reflexure of the said one leg into the said decreased width portion of the aperture when the said one leg is inserted sufficiently in the aperture to align the notch with the edge of the aperture, and said notch being positioned relative to the said part to constrain said part to said predetermined spaced relation.

3. A combination including a support having inner and outer faces and a rigid portion defining an aperture which is decrescent in width, a member to be secured to the support, and a spring clip device adapted for connection to the support and having a snap-fastening part onto which the member may be snapped by pressing the member thereonto toward the support when said device is installed in the aperture with the part in predetermined spaced relation from the outer face of the support, characterized in that the spring clip device comprises a pair of spaced legs receivable through said aperture, said legs being of less width than the portion of the aperture through which they are received and at least one of said legs being of greater width than a decreased width portion of the aperture, said legs being resiliently movable relatively toward and away from each other in a direction generally at right angles to the width of said one leg, and said one leg having a notch at one of its lateral margins, said notch being arranged to engage with both the inner and outer surfaces of the support upon reflexure of the said one leg into the said decreased width portion of the aperture when the said one leg is inserted sufficiently in the aperture to align the notch with the edge of the aperture, and said notch being positioned relative to the said part to constrain said part to said predetermined spaced relation and being of gradually decreasing width inwardly from the outer margin of the leg.

JOHN H. VAN UUM.